Patented Nov. 14, 1950

2,529,546

UNITED STATES PATENT OFFICE 2,529,546

MANUFACTURE OF HYDROGEN CYANIDE

Leonard Fallows and Eric Vernon Mellers, Spondon, near Derby, England, assignors to Celanese Corporation of America, a corporation of Delaware No Drawing. Application December 7, 1945, Serial No. 633,534. In Great Britain January 9, 1945

16 Claims. (Cl. 23—151)

1

This invention relates to the manufacture of hydrogen cyanide by the thermal decomposition of formamide.

In one method of obtaining hydrogen cyanide from formamide, formamide vapor is heated to a temperature at which it breaks down into water and hydrogen cyanide. Although a certain amount of hydrogen cyanide can be produced in this way in the absence of a catalyst, if a reasonably good conversion of formamide to hydrogen cyanide is to be achieved a suitable catalyst must be employed. A number of different substances have been proposed as catalysts for the reaction.

Unfortunately, when formamide vapor is heated it generally breaks down not only into water and hydrogen cyanide, but also into a mixture of carbon monoxide and ammonia. Any formamide which undergoes decomposition into these two gases may, for the purposes of the present manufacture, be regarded as wasted, and it is therefore necessary to carry out the reaction under conditions which not only promote the decomposition of the formamide to water and hydrogen cyanide but do so at the expense of the mode of decomposition which gives rise to carbon monoxide and ammonia. Among these conditions the nature of the catalyst is of great importance.

It is an object of the present invention to provide a catalyst for the decomposition of formamide which effectively promotes the production of hydrogen cyanide but which causes the formation of only comparatively small amounts of carbon monoxide and ammonia.

According to the invention formamide in the vapor phase is subjected to thermal decomposition in the presence of a catalyst comprising a metal tungstate.

The catalyst preferably comprises a tungstate of an alkaline earth metal or an alkali metal, and of those the tungstates of the alkali metals have been found to give the highest conversions to hydrogen cyanide. Sodium tungstate may be employed with advantage. The metal tungstate is preferably employed deposited on a carrier such, for example as pumice, active charcoal, active alumina, carborundum, or silica gel.

The formamide vapor and the tungstate catalyst are preferably heated to a temperature between about 400° and 700° C. and especially between 475° and 625° C. It is advantageous to heat the formamide vapor to such temperatures for a short time only. For example, the formamide vapor may be rapidly heated to the desired temperature, brought into contact with the heated

2 catalyst for a period which is at most a few seconds and may be less than one second, and then rapidly cooled. If desired the formamide vapor may be under a pressure less than atmospheric, or its partial pressure may be reduced by means of a gas which does not adversely affect the reaction, for example nitrogen or carbon monoxide.

In carrying out the invention it is first necessary to obtain the formamide in the vapor phase. If a large body of formamide is boiled, for example in a kettle or similar form of vaporizer, a considerable proportion is usually decomposed, mainly to carbon monoxide and ammonia, by the mere act of vaporization. We have found, however, that by heating liquid formamide very rapidly to a temperature above its boiling point, for example by feeding it into a flash boiler kept at a temperature well above the normal boiling point of formamide, it is possible to obtain a stream of vapor which consists almost entirely of undecomposed formamide. For example formamide may be introduced little by little into a copper flash boiler which is kept at a temperature between about 220° and 300° C.

If desired the formamide may be made by a manufacturing process which gives rise to formamide vapor directly, and may then, without any intermediate treatment involving condensation and subsequent vaporization, be subjected to thermal decomposition in accordance with the present invention. For example it may be made by heating ammonium formate to a temperature above the boiling point of formamide, e. g. to about 230° C., or by the reaction of carbon monoxide and ammonia. However in all such processes the formamide vapor is obtained in admixture with other vapors or permanent gases from which it cannot conveniently be separated before being subjected to thermal decomposition, and which may adversely affect the thermal decomposition to hydrogen cyanide and water or complicate the eventual isolation of the hydrogen cyanide. It is therefore preferred to prepare substantially pure formamide vapor by the rapid vaporization of liquid formamide as described above.

The thermal decomposition of the formamide vapor into water and hydrogen cyanide may be carried out by passing the formamide vapor rapidly through a narrow tube, or through a set of narrow tubes arranged in parallel, packed with the catalyst, and heated in any suitable way, e. g. by gas heating or electrically. Preferably the diameter of the tube or tubes is less than 3 inches. The tubes may, for example be made of or lined with copper. The rate of flow of the formamide is preferably between about 1 and 10, and especially between about 2 and 7 gms. of formamide/hour/cc. of tube space packed with catalyst.

In order to conserve the yield of hydrogen cyanide, it is advisable to cool the products as soon as possible after they leave the decomposition zone, preferably to such a degree as to condense at least the greater part of the hydrogen cyanide. Moreover since a certain amount of ammonia is almost always formed simultaneously with the hydrogen cyanide and this tends to cause the hydrogen cyanide to polymerize, it is preferable to add to the vaporous products or the condensate an acid stronger than hydrogen cyanide in amount at least sufficient to neutralize the ammonia. Advantageously sufficient acetic acid to combine with all the ammonia formed is fed into the vapors leaving the reaction zone. Preferably anhydrous acetic acid is employed for this purpose; solutions of acetic acid in organic solvents, e. g. acetone, are very suitable. If desired a mineral acid, for example hydrochloric acid or sulphuric acid, may be employed instead of acetic acid, but in this case it is usually more difficult to avoid corrosion of the apparatus.

The vaporous products of the decomposition of the formamide are preferably so strongly cooled that only unimportant quantities of hydrogen cyanide remain uncondensed. The aqueous hydrogen cyanide so obtained is in general contaminated with ammonium acetate, acetic acid, unchanged formamide, and possibly other compounds, but from this mixture substantially pure anhydrous hydrogen cyanide can readily be obtained by fractional distillation. Unchanged formamide can be recovered and used again in the process. The gases remaining uncondensed may be freed from any hydrogen cyanide they may contain by scrubbing them with or passing them through an alkaline solution, for example a solution of sodium hydroxide, or in any other suitable way.

After a number of hours the activity of the catalyst will usually be found to have decreased to some extent, but it can be restored by heating the catalyst in the presence of oxygen or air. This regeneration of the catalyst can be performed without removing the catalyst from the reaction tube, by interrupting the flow of formamide vapor and passing a stream of air over the heated catalyst for a short period, after which the flow of formamide vapor can be resumed.

This invention is illustrated by the following examples:

*Example I*

Liquid formamide was fed into a copper flash-boiler maintained at a temperature of about 250° C., and the vapor so produced was at once led through an electrically heated copper tube 1½ inches in diameter packed with a catalyst consisting of sodium tungstate deposited on pumice. The temperature of the tube was 510° C., and the rate of flow of the formamide was about 5.5 gms./hour/cc. of the tube space packed with catalyst. A mixture consisting of 70% of anhydrous acetic acid and 30% of acetone was injected into the vaporous products after they had left the heated tube, and they were then passed first through a water-cooled condenser and then through a copper coil and receiver kept at about 0° C., in which most of the hydrogen cyanide produced was condensed and collected, together with water, ammonium acetate, acetone, acetic acid and some unchanged formamide. The gases remaining uncondensed were freed from hydrogen cyanide by washing with a 10% sodium hydroxide solution.

The condensate was fractionally distilled to isolate the hydrogen cyanide. Neglecting the small amount of hydrogen cyanide which was not condensed and which was subsequently washed out of the gases with the alkali solution, approximately 80% of the formamide was converted into hydrogen cyanide; of the remaining 20% a substantial part was recovered unchanged.

*Example II*

The procedure described in Example I was followed, except that the catalyst consisted of calcium tungstate deposited on carborundum, the tube was heated to 600° C., and the rate of flow of the formamide was about 3 gms./hour/cc. of the tube space packed with catalyst.

The hydrogen cyanide obtained from the condensate corresponded to about 67% of the initial formamide, and as before a considerable quantity of unchanged formamide was also recovered. Employing a tube temperature of 490° C., and passing the same weight of formamide per hour through the tube, the amount of hydrogen cyanide obtained corresponded to 63% of the initial formamide while the amount of unchanged formamide recovered was more than proportionately increased.

Having described our invention, what we desire to secure by Letters Patent is:

1. Process for the manufacture of hydrogen cyanide, which comprises subjecting formamide in the vapor phase to thermal decomposition in the presence of a catalyst comprising a metal tungstate.

2. Process for the manufacture of hydrogen cyanide, which comprises subjecting formamide in the vapor phase to thermal decomposition at a temperature of 400 to 700° C. in the presence of a tungstate of a metal selected from the group consisting of alkali and alkaline earth metals.

3. Process for the manufacture of hydrogen cyanide, which comprises subjecting formamide in the vapor phase to thermal decomposition at a temperature of 400 to 700° C. in the presence of sodium tungstate.

4. Process for the manufacture of hydrogen cyanide, which comprises subjecting formamide in the vapor phase to thermal decomposition at a temperature of 400 to 700° C. in the presence of a tungstate of a metal selected from the group consisting of alkali and alkaline earth metals deposited on a carrier.

5. Process for the manufacture of hydrogen cyanide, which comprises subjecting formamide in the vapor phase to thermal decomposition at a temperature of 475 to 625° C. in the presence of a tungstate of a metal selected from the group consisting of alkali and alkaline earth metals deposited on a carrier.

6. Process for the manufacture of hydrogen cyanide, which comprises subjecting formamide in the vapor phase to thermal decomposition at a temperature of 475 to 625° C. in the presence of sodium tungstate deposited on a carrier.

7. Process for the manufacture of hydrogen cyanide, which comprises passing formamide vapor through a tube of diameter less than 3 inches heated to 400 to 700° C. and containing as catalyst a tungstate of a metal selected from the group consisting of alkali and alkaline earth metals deposited on a carrier, the rate of flow of the formamide vapor being 1 to 10 grams per hour per cubic centimeter of tube space containing the catalyst.

8. Process for the manufacture of hydrogen cyanide, which comprises passing formamide vapor through a tube of diameter less than 3 inches heated to 475 to 625° C. and containing as catalyst sodium tungstate deposited on a carrier, the rate of flow of the formamide vapor being 1 to 10 grams per hour per cubic centimeter of tube space containing the catalyst.

9. Process for the manufacture of hydrogen cyanide, which comprises feeding liquid formamide into a flash-boiler maintained at a temperature above the boiling point of formamide and passing the vapor so produced through a tube of diameter less than 3 inches heated to 400 to 700° C. and containing as catalyst a tungstate of a metal selected from the group consisting of alkali and alkaline earth metals deposited on a carrier, the rate of flow of the formamide vapor being 1 to 10 grams per hour per cubic centimeter of tube space containing the catalyst.

10. Process for the manufacture of hydrogen cyanide, which comprises feeding liquid formamide into a flash-boiler maintained at a temperature above the boiling point of formamide and passing the vapor so produced through a tube of diameter less than 3 inches heated to 475 to 625° C. and containing as catalyst sodium tungstate deposited on a carrier, the rate of flow of the formamide vapor being 1 to 10 grams per hour per cubic centimeter of tube space containing the catalyst.

11. Process for the manufacture of hydrogen cyanide, which comprises subjecting formamide in the vapor phase in admixture with carbon monoxide to thermal decomposition at a temperature of 400 to 700° C. in the presence of a tungstate of a metal selected from the group consisting of alkali and alkaline earth metals.

12. Process for the manufacture of hydrogen cyanide, which comprises subjecting formamide in the vapor phase in admixture with carbon monoxide to thermal decomposition at a temperature of 475 to 625° C. in the presence of sodium tungstate deposited on a carrier.

13. Process for the manufacture of hydrogen cyanide, which comprises passing formamide vapor in admixture with carbon monoxide through a tube of diameter less than 3 inches heated to 400 to 700° C. and containing as catalyst a tungstate of a metal selected from the group consisting of alkali and alkaline earth metals deposited on a carrier, the rate of flow of the formamide vapor being 1 to 10 grams per hour per cubic centimeter of tube space containing the catalyst.

14. Process for the manufacture of hydrogen cyanide, which comprises passing formamide vapor in admixture with carbon monoxide through a tube of diameter less than 3 inches heated to 475 to 625° C. and containing as catalyst sodium tungstate deposited on a carrier, the rate of flow of the formamide vapor being 1 to 10 grams per hour per cubic centimeter of tube space containing the catalyst.

15. Process for the manufacture of hydrogen cyanide, which comprises subjecting formamide in the vapor phase to thermal decomposition at a temperature of 400 to 700° C. in the presence of a tungstate of a metal selected from the group consisting of alkali and alkaline earth metals and cooling the vaporous products of the decomposition, in the presence of at least enough of an acid stronger than hydrogen cyanide to combine with any ammonia contained in the said products, to a temperature at which at least the greater part of the hydrogen cyanide in the said products is condensed.

16. Process for the manufacture of hydrogen cyanide, which comprises passing formamide vapor through a tube of diameter less than 3 inches heated to 400 to 700° C. and containing as catalyst a tungstate of a metal selected from the group consisting of alkali and alkaline earth metals deposited on a carrier, the rate of flow of the formamide vapor being 1 to 10 grams per hour per cubic centimeter of tube space containing the catalyst and cooling the vaporous products leaving the tube, in the presence of at least enough acetic acid to combine with any ammonia contained in the said products, to a temperature at which at least the greater part of the hydrogen cyanide in the said products is condensed.

LEONARD FALLOWS.
ERIC VERNON MELLERS.

REFERENCES CITED

The following references are of record in the file of this patent:

UNITED STATES PATENTS

| Number | Name | Date |
| --- | --- | --- |
| 1,591,900 | Walker | July 6, 1926 |
| 2,042,451 | Bond et al. | June 2, 1936 |
| 2,086,507 | Larson | July 6, 1937 |

OTHER REFERENCES

Gregory, "Uses and Applications of Chemical and Related Materials," pp. 561–562. Published by Reinhold Publishing Co., N. Y. (1939).